(12) United States Patent
Henikl et al.

(10) Patent No.: US 11,040,445 B2
(45) Date of Patent: Jun. 22, 2021

(54) CARTESIAN CONTROL OF A BOOM TIP OF A LARGE MANIPULATOR, IN PARTICULAR A CONCRETE PUMP

(71) Applicant: Schwing GmbH, Herne (DE)

(72) Inventors: Johannes Henikl, Essen (DE); Reiner Vierkotten, Oberhausen (DE)

(73) Assignee: Schwing GmbH, Herne (DE)

( * ) Notice: Subject to any disclaimer, the term of this patent is extended or adjusted under 35 U.S.C. 154(b) by 115 days.

(21) Appl. No.: 16/091,755

(22) PCT Filed: Apr. 6, 2017

(86) PCT No.: PCT/EP2017/058235
§ 371 (c)(1),
(2) Date: Oct. 5, 2018

(87) PCT Pub. No.: WO2017/174714
PCT Pub. Date: Oct. 12, 2017

(65) Prior Publication Data
US 2019/0160667 A1    May 30, 2019

(30) Foreign Application Priority Data

Apr. 7, 2016 (DE) .................... 10 2016 106 406.8

(51) Int. Cl.
*B25J 9/16* (2006.01)
*E04G 21/04* (2006.01)
(Continued)

(52) U.S. Cl.
CPC ........ *B25J 9/1638* (2013.01); *E04G 21/0463* (2013.01); *G05B 19/402* (2013.01);
(Continued)

(58) Field of Classification Search
None
See application file for complete search history.

(56) References Cited

U.S. PATENT DOCUMENTS

2003/0196506 A1* 10/2003 Rau ..................... E04G 21/0454
74/473.1
2004/0076502 A1*  4/2004 Nissing .................. B66C 13/18
414/699

(Continued)

FOREIGN PATENT DOCUMENTS

CN       103206090 A    7/2013
DE       10046546 A1    3/2002
(Continued)

*Primary Examiner* — Peter D Nolan
*Assistant Examiner* — Demetra R Smith-Stewart
(74) *Attorney, Agent, or Firm* — Faegre Drinker Biddle & Reath LLP

(57) ABSTRACT

A large manipulator including an extendable folding boom. The extendable boom includes a turntable that is rotatable about a vertical axis and boom segments pivotable at folding joints about folding axes in relation to an adjacent boom segment or the turntable via respective drive assemblies. The extendable boom further includes rotary angle sensors configured to detect folding angles between adjacent boom segments or between one of the boom segments and the adjacent turntable. The extendable boom further includes an inclination sensor arranged at a last of the boom segments forming a boom tip and a computing unit configured to establish an elastic deformation of the extendable folding boom based on the detected folding angles and the inclination of the last boom segment.

14 Claims, 1 Drawing Sheet

(51) Int. Cl.
*G05B 19/402* (2006.01)
*G05B 19/401* (2006.01)

(52) U.S. Cl.
CPC ............. *G05B 19/4015* (2013.01); *G05B 2219/39189* (2013.01); *G05B 2219/45102* (2013.01)

(56) References Cited

U.S. PATENT DOCUMENTS

| | | | |
|---|---|---|---|
| 2010/0139792 A1* | 6/2010 | Rau | B66C 1/44 137/615 |
| 2015/0081164 A1* | 3/2015 | Yi | G01B 21/22 701/34.4 |
| 2016/0076263 A1* | 3/2016 | Tebeek | B66C 13/066 701/50 |
| 2017/0081154 A1* | 3/2017 | Vierkotten | B66C 23/54 |

FOREIGN PATENT DOCUMENTS

| | | |
|---|---|---|
| DE | 10240180 A1 | 3/2004 |
| DE | 102009007310 A1 | 8/2010 |

* cited by examiner

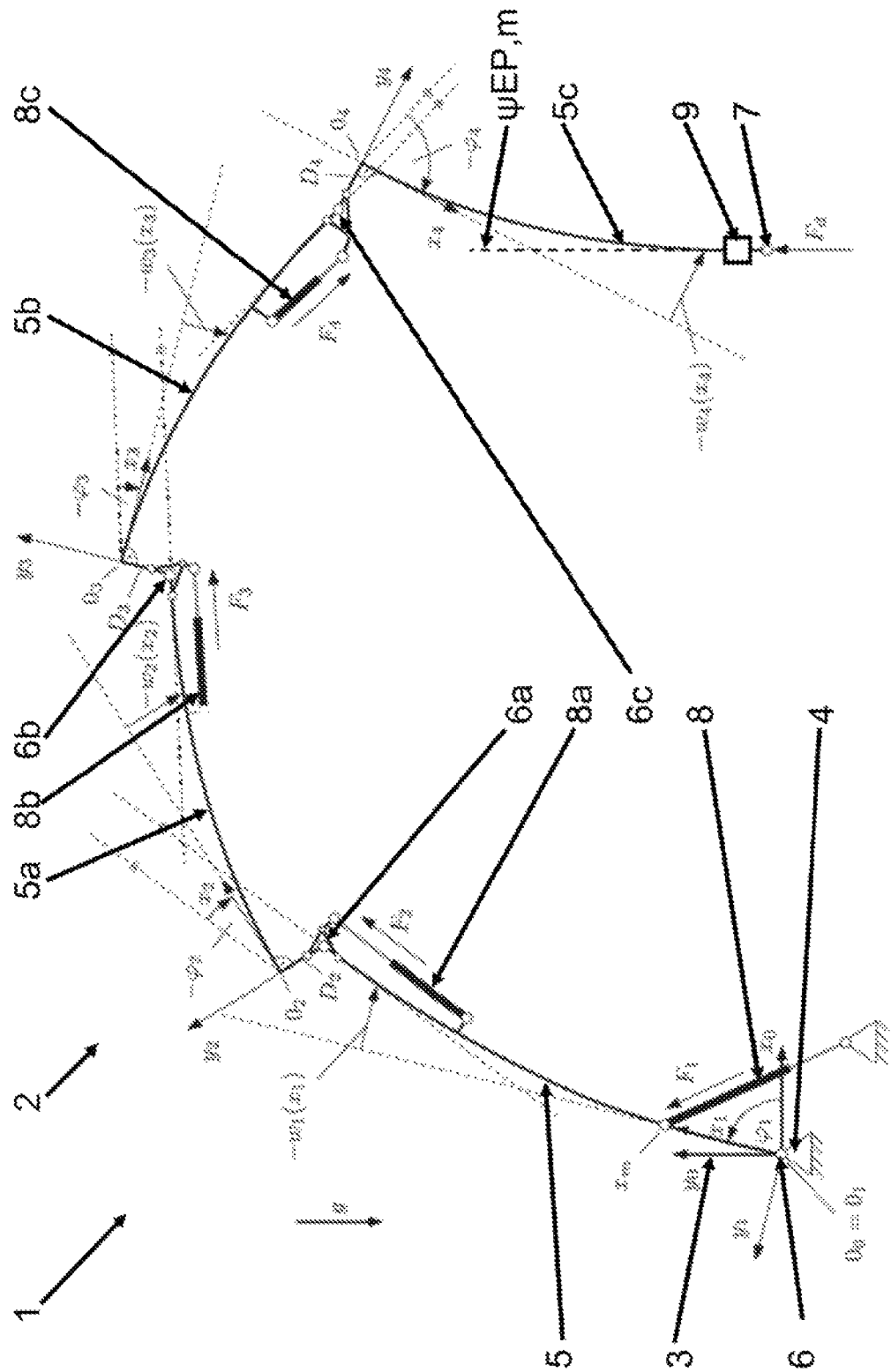

CARTESIAN CONTROL OF A BOOM TIP OF A LARGE MANIPULATOR, IN PARTICULAR A CONCRETE PUMP

CROSS-REFERENCE TO RELATED APPLICATION

This application is a U.S. 371 Application of International Application No. PCT/EP2017/058235, filed Apr. 6, 2017, which claims priority to Germany Patent Application No. 10 2016 106 406.8, filed Apr. 7, 2016, both of which are herein incorporated by reference in their entireties.

The invention relates to a large manipulator, a truck-mounted concrete pump comprising a large manipulator according to the invention, and a method for controlling a large manipulator.

DE 10 2014 007 071 A1 has disclosed a large manipulator comprising an extendable folding boom, which has a turntable that is rotatable about a vertical axis and a plurality of boom segments, wherein the boom segments are pivotable to a limited extent at folding joints, in each case about folding axes in relation to an adjacent boom segment or the turntable, by means of a respective drive assembly, comprising at least one rotary angle sensor for detecting the folding angle between two adjacent boom segments or between a first boom segment and the adjacent turntable.

In order to facilitate an at least partly automated operation of a large manipulator, it is necessary, depending on the problem, to know the exact position of the boom segments. However, the rotary angle sensors known from the prior art can only be used to establish the angle between the boom segments. Particularly in the case of an elastic sag of the individual boom segments, the exact position can deviate from the position established by the rotary angle sensors. A measurement of the position of the boom segments by way of direct methods from metrology, such as by the use of, e.g., distance sensors, in particular laser, infrared, ultrasound or GPS, is only possible to a limited extent or only possible with much outlay on account of the surrounding environment at the building site and for further reasons, and therefore it is unsuitable for practical use. Should only the joint angle sensors be used for the measurement, it is also possible to calculate the elastic deformation of the large manipulator by way of mathematical models. However, the load arising in the case of large manipulators is often only known to a limited extent, for example on account of fresh concrete situated in the concrete conveying conduits in the case of truck-mounted concrete pumps. This could likewise be taken into account in the mathematical models by measuring the arising forces, for example by way of pressure sensors attached to the hydraulic drive assemblies. However, a general disadvantage to this solution is that the mathematical models have to be very accurate for sufficiently precise results, meaning a great development outlay. Moreover, it is necessary to take into account the fact that the error of the measurement based on models increases with the dimensions of the outrigger and yields unusable results if no further sensor means are used.

It is therefore an object of the invention to provide an improved large manipulator, which can be operated easily and reliably and which ensures that deductions about the exact position of the individual boom segments are possible in a simple manner.

This object is achieved by a large manipulator having the features of claim 1, by a truck-mounted concrete pump having the features of claim 7, and by a method as claimed in claim 8.

According to the invention, an inclination sensor is arranged at the last boom segment, which forms the boom tip, and the large manipulator has a control unit that is configured to approximately establish the elastic deformation of the folding boom taking account of the folding angles that were detected between all boom segments and the turntable and the inclination of the last boom segment that was detected by means of the inclination sensor. The elastic deformation of the folding boom is understood to mean the sum of all elastic sags of all boom segments of the folding boom. As a result, a simple and reliable operation of the large manipulator can be ensured.

Advantageous configurations and developments of the invention emerge from the dependent claims.

According to an advantageous configuration of the invention, provision is made for the inclination sensor to be embodied as an angle sensor for surveying. This is advantageous in that the precise inclination of the last boom segment in relation to the direction of the gravitational acceleration is known at all times. As a result, the inclination sensor operates in a well-defined reference system.

An advantageous configuration of the invention provides for the control unit to calculate the sag of the individual boom segments in approximate fashion in the form of correction angles on the basis of the detected folding angles and on the basis of the detected inclination of the last boom segment. In this way, a deduction about the sag of the boom segments can be made using only one additional inclination sensor and a correspondingly configured control unit.

Further, it is advantageous that the control unit calculates corrected folding angles on the basis of the calculated sag of the individual boom segments in the form of the correction angles. As a result, the position of the individual boom segments in space can be deduced in a simple manner by virtue of the kinematics of the outrigger being considered, in a simplified fashion, as a rigid body problem where the folding angles that have been corrected by the calculated sag are assumed to be the folding angles between the boom segments.

It is particularly advantageous that the control unit uses the folding angles that were corrected by calculation for the purposes of actuating the drive assemblies and/or for the purposes of monitoring the pivoting movement of individual boom segments in relation to one another. By taking account of the folding angles that were corrected by calculation when actuating the drive assemblies and when monitoring the pivoting movement of individual boom segments, a simple option is provided to facilitate simultaneous complex movements of a plurality of boom segments by way of simple prescriptions of the user, for example within the scope of a single-lever control. On account of the folding angles that were corrected by calculation, the control unit is able to estimate the position of individual boom segments in space and to induce and control movements of the individual boom segments by way of the assigned drive assemblies in more precise fashion. Advantageously, provision is made of a control unit for actuating the drive assemblies, wherein the control unit converts a drive command, which specifies a desired movement of the boom tip of the folding boom or of an end hose connected thereto, into actuation signals for the drive assemblies. What is essential is that, in this case, an inclination sensor is only arranged at the last boom segment, which forms the boom tip, wherein the control device is configured to convert the drive command into the actuation signals taking account of folding angles and the inclination of the last boom segment detected by means of the inclination sensor. This is particularly advantageously suitable for realizing a Cartesian control of the boom tip, i.e., a so-called single-lever control. For such a single-lever control, it is expedient to know the position of the individual boom segments in space. In particular, it is advantageous to be able to detect the radial and vertical distance of the boom tip from the turntable. On the basis of the position of the individual boom segments, to be determined by means of sensors, the intended speeds for the individual joints which lead to the realization of the intended movement of the boom tip that was desired by the user are established by the algorithms of the Cartesian control that are executed in the control unit. Here, it is necessary for the determination of the position of the boom using measurement technology to be as accurate as possible since there may be an inaccurate guide of the boom tip in the case of measurement errors that are too large. The invention satisfies these requirements. At the same time, the invention can be implemented with comparatively little outlay in the case of an available large manipulator.

The large manipulator according to the invention is preferably used for distributing thick matter. In particular, it serves to convey concrete.

Further, the subject matter of the invention relates to a truck-mounted concrete pump. The truck-mounted concrete pump according to the invention comprises a vehicle chassis, a thick matter pump, in particular a concrete pump, arranged at the vehicle chassis, and a large manipulator having the above-described control and sensor system.

Moreover, the subject matter of the invention relates to a method for controlling a large manipulator comprising the control and sensor system as described above and below. In this method, the folding angles respectively between the adjacent boom segments and between the first boom segment and the adjacent turntable are detected. Furthermore, the inclination of the last boom segment is detected. Subsequently, the sag of the individual boom segments is calculated in approximate fashion on the basis of the detected folding angles and the detected inclination. This provides a simple option for drawing conclusions about the elastic deformation of the folding boom.

Advantageously, a drive command, which specifies a desired movement of the boom tip of the folding boom or of an end hose attached thereto, is subsequently converted into actuation signals for the drive assemblies on the basis of the detected folding angles and the sag of the boom segments calculated in approximate fashion. This method provides a simple and reliable option of converting drive commands for the boom tip into actuation signals for the individual drive assemblies.

In order to increase the precision of the detection of the position of the boom segments, it is moreover advantageous to combine the proposed method with mathematical models of the elastic outrigger by virtue of the result of the mathematical model being compared to the measurement of the inclination of the last boom segment.

Moreover, a further improvement in the quality of the measurement is possible if the forces occurring at the large manipulator are detected, for example by pressure sensors applied to the cylinders, and are taken into account in the mathematical model.

Further features, details and advantages of the invention emerge from the following description and on the basis of the drawing. An exemplary embodiment of the invention is illustrated purely schematically in the following drawing and described in more detail below. In detail:

FIG. 1: shows a schematic illustration of a large manipulator according to the invention.

FIG. 1 shows a schematic illustration of a large manipulator 1. Within the scope of this disclosure, the term large manipulator is understood to mean a work device such as, e.g., an arm, an outrigger, a hoisting gear, a hoisting frame or a boom. The large manipulator 1 comprises an extendable folding boom 2, which is arranged on a turntable 4 that is rotatable about a vertical axis 3. The folding boom 2 comprises a multiplicity of boom segments 5, 5a, 5b, 5c, a total of four in the exemplary embodiment, which are pivotable at folding joints 6, 6a, 6b, 6c, in each case about folding axes in relation to an adjacent boom segment 5, 5a, 5b, 5c or the turntable 4, by means of respectively one drive assembly 8, 8a, 8b, 8c. By way of example, the drive assemblies 8, 8a, 8b, 8c are embodied as differential hydraulic cylinders, which pivot the boom segments 5, 5a, 5b, 5c to a restricted extent against one another by way of suitable lever mechanisms. However, by way of example, the boom segments 5, 5a, 5b, 5c can also be pivoted against one another, partly pivoted against one another without limitation, by means of a worm drive or any other suitable rotational drive. Rotary angle sensors for detecting the respective folding angle $\varphi 1$, $\varphi 2$, $\varphi 3$, $\varphi 4$ of the respective folding joint 6, 6a, 6b, 6c between two adjacent boom segments 5, 5a, 5b, 5c and between the first boom segment 5 and the adjacent turntable 4 are arranged at the folding joints 6, 6a, 6b, 6c. By way of example, the folding angles $\varphi 1$, $\varphi 2$, $\varphi 3$, $\varphi 4$ can also be established indirectly by way of rotational angle sensors attached to the levers of the reversing linkages or, for example, by way of longitudinal measurement systems arranged at the drive assemblies 8, 8a, 8b, 8c. What is essential to the invention is that the folding angles $\varphi 1$, $\varphi 2$, $\varphi 3$, $\varphi 4$ detected at the folding joints 6, 6a, 6b, 6c contain no portion that emerges from the sag of the boom segments.

A control unit, not illustrated here, is configured to actuate the drive assemblies 8, 8a, 8b, 8c, wherein the control unit converts a drive command, which specifies a desired movement of the boom tip 7 of the folding boom or of an end hose attached thereto, into control signals for the individual drive assemblies 8, 8a, 8b, 8c. To this end, an inclination sensor 9 is only situated at the last boom segment 5c, which forms the boom tip 7, said inclination sensor preferably being embodied as an angle sensor for surveying and detecting the inclination of the last boom segment 5c in relation to the direction of the gravitational acceleration or in relation to the ground. On the basis of the folding angle $\varphi 1$, $\varphi 2$, $\varphi 3$, $\varphi 4$ detected by the rotational angle sensors and on the basis of the inclination $\varphi_{EP,m}$ of the last boom segment 5c detected by the inclination sensor 9, the control unit calculates the sag w1, w2, w3, w4 of the individual boom segments 5, 5a, 5b, 5c in approximate fashion. When calculating and dividing the sag w1, w2, w3, w4 among the individual boom segments 5, 5a, 5b, 5c, it is possible to take account of a different weighting for the individual boom segments 5, 5a, 5b, 5c. This weighting can be undertaken dependent upon structural conditions of the large manipulator or of the individual boom segments. Moreover, a potential inclination of the individual boom segments 5, 5a, 5b, 5c can be taken into account when calculating and dividing the sag w1, w2, w3, w4 among the individual boom segments 5, 5a, 5b, 5c.

FIG. 1 indicates the sag w1, w2, w3, w4 at the individual boom segments 5, 5a, 5b, 5c. On the basis of the sag w1, w2, w3, w4 of the individual boom segments 5, 5a, 5b, 5c, the control unit calculates corrected folding angles $\varphi 1k$, $\varphi 2k$, $\varphi 3k$, $\varphi 4k$. These corrected folding angles $\varphi 1k$, $\varphi 2k$, $\varphi 3k$, $\varphi 4k$ are used by the control is unit for the purposes of actuating the drive assemblies, and also for the purposes of monitoring the pivoting movement of the individual boom segments 5, 5a, 5b, 5c in relation to one another.

Below, a possible configuration of the method according to the invention for controlling the above-described large manipulator 1 is discussed in detail. Respectively detecting the folding angles φ1, φ2, φ3, φ4 between two adjacent boom segments 5, 5a, 5b, 5c and between a boom segment 5 and the adjacent turntable 4 is proposed. Moreover, the inclination $\psi_{EP,m}$ of the last boom segment 5c is detected by the inclination sensor 9 arranged at this boom segment. The sag w1, w2, w3, w4 of the individual boom segments 5, 5a, 5b, 5c is calculated in approximate fashion on the basis of the detected folding angles φ1, φ2, φ3, φ4 and the detected inclination $\psi_{EP,m}$. Subsequently, a driving command, which specifies a desired movement of the boom tip 7 of the folding boom 2 or of an end hose arranged thereon, is converted into control signals for the drive assemblies 8, 8a, 8b, 8c on the basis of the detected folding angles φ1, φ2, φ3, φ4 and the calculated sag w1, w2, w3, w4.

In order to implement this method, the kinematics of the large manipulator are described as a simplified rigid body problem. The folding boom 2 illustrated schematically in FIG. 1 with a total of four boom segments 5, 5a, 5b, 5c is shown from the folding axis direction. The degrees of freedom of the large manipulator are given by the rigid body angles or the folding angles φ1, φ2, φ3, φ4, and by the elastic sag w1, w2, w3, w4 of the individual boom segments 5, 5a, 5b, 5c. The absolute movements of the large manipulator are described in an inertial coordinate system $0_0 x_0 y_0$. Moreover, a local coordinate system $0_i x_i y_i$ (which relates to boom segment 5 for i=1, relates to boom segment 5a for i=2, relates to boom segment 5b for i=3, relates to boom segment 5c for i=4) is set for each boom segment 5, 5a, 5b, 5c, the xi-axis of which extends along the axis of symmetry of the non-deformed boom segment. Since the boom segments for i≥2 typically have a fold at the start, the axis of symmetry thereof does not intersect the axis of the folding joints 6, 6a, 6b, 6c. Therefore, the origin of the local coordinate systems $0_i x_i y_i$ is placed onto the point of intersection of the axis of symmetry with that orthogonal straight-line that extends through the folding joint axis. The distances between the folding joint axes and the origins of the local coordinate systems $0_i x_i y_i$ are taken into account as distance $D_i$ for i=2, ..., N. The lengths of the individual boom segments are denoted by $L_i$, for i=2, ..., N.

The kinematic relationships between the local coordinate systems $0_i x_i y_i$ of the individual boom segments 5, 5a, 5b, 5c and the inertial coordinate system $0_0 x_0 y_0$ can be represented by rotation matrices and translation vectors. In the case of a simplified consideration of the large manipulator system as a rigid body problem, $w_i(x_i)=0$ for i=1, ..., N can be assumed for the elastic sag. The initial coordinates of a point on the line of symmetry of a boom segment can be represented for the i-th boom segment by a vector $r_i^i(x_i)=[x_i, 0]^T$, which describes the coordinates of the point in the local coordinate system $0_i x_i y_i$, and by the vector of the folding angle $\varphi=[\varphi_1, \ldots, \varphi_N]^T$ according to the following formula:

$$r_0^i(x_i) = R_0^i(\varphi) r_i^i(x_i) + d_0^i(\varphi).$$

Here, the matrix $R_0^i(p)$ for j=2, ..., N describes the local twist of the coordinate system $0_i x_i y_i$ in relation to the inertial coordinate system $0_0 x_0 y_0$. The component of the translational displacement between the local coordinate system $0_i x_i y_i$ and the inertial coordinate system $0_0 x_0 y_0$ is described by $d_0^i(p)$.

A calculated inclination $\psi_{EP,b}$ emerges from the sum of all measured folding angles $\varphi_{i,m}$ using the implemented definitions of the kinematic degrees of freedom of the large manipulator system and the rigid body description set forth above, as set forth below:

$$\psi_{EP,b} = \sum_{i=1}^{N} \varphi_{i,m}.$$

The deviation $\Delta\psi_{EP}=\psi_{EP,b}-\psi_{EP,m}$ between the calculated inclination $\psi_{EP,b}$ and the actually detected inclination $\psi_{EP,m}$, i.e., the inclination measured by the inclination sensor 9 at the last boom segment, must be divided in the form of correction values $\Delta\varphi_i$, which are directly related to the sag $w_i$, among the individual folding joints 6, 6a, 6b, 6c. In this respect, the following applies:

$$\Delta\psi_{EP} = \sum_{i=1}^{N} \Delta\varphi_i.$$

In a vector representation, this problem can be described as an optimization problem of the form $$\min_{\Delta\varphi} \Delta\varphi^T W \Delta\varphi,$$

with $\Delta\varphi=[\Delta\varphi_1, \ldots, \Delta\varphi_N]^T$ and the constraint $$\Delta\psi_{EP} = 1^{1 \times N} \Delta\varphi$$

and the weighting matrix embodied as a diagonal matrix $$W = \begin{bmatrix} \frac{1}{\cos(\psi_{1,b})} & \cdots & 0 \\ \vdots & \ddots & \vdots \\ 0 & \cdots & \frac{1}{\cos(\psi_{N,b})} \end{bmatrix}.$$

Here, $\psi_{i,b}$ for i=1, ..., N denote the calculated inclinations of the individual boom segments 5, 5a, 5b, 5c in space:

$$\psi_{i,b} = \sum_{j=1}^{i} \varphi_{j,m}$$

Without a detailed explanation, the solution to this quadratic optimization problem with a linear equation condition emerges as $$\Delta\varphi = \begin{bmatrix} \cos(\psi_{1,b}) \\ \vdots \\ \cos(\psi_{N,b}) \end{bmatrix} \left( \sum_{i=1}^{N} \cos(\psi_{i,b}) \right)^{-1} \Delta\psi_{EP}.$$

On account of the weighting matrix with the cosine function, it is possible to ensure that the boom segments with an approximately vertical position are weighted more strongly in the optimization problem and the solution to the correction angle to thereof is small. Since the numerators of the fractions of the diagonal elements in the weighting matrix are always 1, there is a uniform distribution of the sag among all boom segments 5, 5a, 5b, 5c in the case of an extended folding boom. A different weighting on the basis of the numerator for each boom segment 5, 5a, 5b, 5c additionally leads to a higher accuracy if structural features of the folding is boom 2 or the individual boom segments 5, 5a, 5b, 5c are taken into account in this differentiated weighting.

Using the solution $\Delta\varphi$, the equivalent joint angles $\varphi_k = [\varphi_{1,k}, \ldots, \varphi_{N,k}]^T$ that are corrected by the sag can be calculated by $$\varphi_{i,k} = \varphi_{i,m} - \Delta\varphi_i.$$

The implementation of the algorithms of the Cartesian control is then carried out with the angles $\varphi_{i,k}$ that have been corrected for the sag. By way of example, the coordinates of the boom tip 7 are calculated on the basis of $$r_0^{EP} = R_0^N(\varphi_k) r_N^N(L_N) + d_0^N(\varphi_k).$$

The precision of the detection of the position of the boom segments 5, 5a, 5b, 5c can be increased further by virtue of the proposed method being combined with mathematical models of the elastic outrigger by virtue of the result of the mathematical model being compared to the measurement of the inclination $\psi_{EP,m}$ of the last boom segment 5c.

A further improvement in the quality of the measurement is possible if the forces arising at the large manipulator 1 are detected, for example by pressure sensors attached to the drive assemblies 8, 8a, 8b, 8c embodied as hydraulic cylinders, said pressure sensors detecting the hydraulic pressure in the cylinder chambers and hence supplying an indication for the load of the respective boom segment and being taken into account in the mathematical model.

In the previous considerations, the assumption was made that the large manipulator 1 was set up completely horizontally. However, this is not always the case, since a setup with up to 3 degrees of lateral inclination to the horizontal is admissible in the case of a large manipulator in the form of a truck-mounted concrete pump, for example. In the calculation method presented here, such a machine inclination would only have a minor effect on the establishment of the position of the boom segments 5, 5a, 5b, 5c, but a further improvement in the quality of the measurement would be possible by including an inclination sensor on the main chassis of the machine or on the turntable 4.

The control unit, or else the computing unit, determines the correction angles $\Delta\varphi_1, \Delta\varphi_2, \Delta\varphi_3, \Delta\varphi_4$ on the basis of the deviation of the inclination $\psi_{EP,m}$ detected by the inclination sensor 9 from an inclination $\psi_{EP,b}$ of the last boom segment 5c that is calculated using a mathematical model. A simplified rigid body model of the large manipulator 1 can be used as a mathematical model. Alternatively, an elastic model of the large manipulator 1 can be used as a mathematical model. Here, the elastic model can be supplied with the measurement of forces arising at the large manipulator 1. Pressure sensors, which detect the pressures in the chambers of the hydraulic drive assemblies 8, 8a, 8b, 8c embodied as differential cylinders, are used to measure forces arising at the large manipulator 1. The control unit is configured to convert a drive command into actuation signals for the drive assemblies 8, 8a, 8b, 8c, depending on the calculated correction angles $\Delta\varphi_1, \Delta\varphi_2, \Delta\varphi_3, \Delta\varphi_4$. The drive command specifies a desired movement of the boom tip 7 of the folding boom 2 or of an end hose attached thereto, in particular in the direction of Cartesian (or polar) coordinates.

LIST OF REFERENCE SIGNS

1 Large manipulator
2 Folding boom
3 Vertical axis ($y_0$)
4 Turntable
5 5a, 5b, 5c Boom segments
6 6a, 6b, 6c Folding joints
7 Boom tip
8 8a, 8b, 8c Drive assemblies
9 Inclination sensor

The invention claimed is:

1. A large manipulator comprising:
an extendable folding boom including:
a turntable that is rotatable about a vertical axis,
boom segments pivotable at folding joints about folding axes in relation to an adjacent boom segment or the turntable via respective drive assemblies,
rotary angle sensors respectively arranged at the folding joints and configured to detect folding angles between adjacent boom segments or between one of the boom segments and the adjacent turntable, wherein the rotary angle sensors do not detect elastic deformation of the individual boom segments,
an inclination sensor arranged at a last of the boom segments, the last boom segment forming a boom tip, wherein the inclination sensor is configured to detect inclination of the last boom segment in relation to gravitational acceleration or in relation to the ground, and
a computing unit configured to establish elastic deformation of the extendable folding boom based on the detected folding angles from the rotary sensors and the inclination of the last boom segment from the inclination sensor.

2. The large manipulator of claim 1, wherein the computing unit is configured to calculate correction angles, representing calculated sag of individual boom segments, based on the detected folding angles and the detected inclination of the last boom segment.

3. The large manipulator of claim 2, wherein the computing unit is configured to calculate corrected folding angles based on the calculated correction angles.

4. The large manipulator of claim 3, wherein the computing unit is configured to use the corrected folding angles as part of actuating the drive assemblies and/or monitoring pivoting movement of individual boom segments in relation to one another.

5. The large manipulator of claim 1, wherein the computing unit is configured to actuate the drive assemblies, wherein the computing unit is configured to convert a drive command, which specifies a desired movement of the boom tip or of an end hose connected thereto, into actuation signals for the drive assemblies, wherein the computing unit is configured to convert the drive command into the actuation signals taking account of at least one folding angle and the inclination of the last boom segment.

6. The large manipulator of claim 1, wherein the inclination sensor is arranged at the boom tip.

7. The large manipulator of claim 1, wherein the inclination sensor is the only inclination sensor of the large manipulator.

8. A truck-mounted concrete pump comprising:
a vehicle chassis;
a thick matter pump arranged at the vehicle chassis; and
a large manipulator including:
an extendable folding boom having:
a turntable that is rotatable about a vertical axis,
boom segments pivotable at folding joints about folding axes in relation to an adjacent boom segment or the turntable via respective drive assemblies,
rotary angle sensors respectively arranged at the folding joints and configured to detect folding angles between adjacent boom segments or between one of the boom segments and the adjacent turntable, wherein the rotary angle sensors do not detect elastic deformation of the individual boom segments, an inclination sensor arranged at a last of the boom segments, the last boom segment forming a boom tip, wherein the inclination sensor is configured to detect inclination of the last boom segment in relation to gravitational acceleration or in relation to the ground, and a computing unit configured to establish elastic deformation of the extendable folding boom based on the detected folding angles from the rotary sensors and the inclination of the last boom segment from the inclination sensor.

9. The truck-mounted concrete pump of claim 8, wherein the inclination sensor is arranged at the boom tip.

10. The truck-mounted concrete pump of claim 8, wherein the inclination sensor is the only inclination sensor of the large manipulator.

11. A method for controlling a large manipulator, the large manipulator including a turntable, boom segments pivotable with respect to each other or the turntable, rotary angles sensors, and an inclination sensor, the method comprising:

detecting, via the rotary angle sensors respectively arranged at folding joints, folding angles between adjacent boom segments and between a first of the boom segments and the adjacent turntable, wherein the rotary angle sensors do not detect elastic deformation of the individual boom segments;

detecting, via the inclination sensor, inclination of a last segment of the boom segments, wherein the inclination sensor is configured to detect inclination of the last boom segment in relation to gravitational acceleration or in relation to the ground; and calculating, via a computing unit, sag of individual boom segments based on the detected folding angles and the detected inclination.

12. The method of claim 11, wherein the last segment forms a boom tip, the method further comprising:

calculating, via the computing unit, correction angles representing calculated sag of individual boom segments based on the detected folding angles and the detected inclination of the last boom segment;

generating a drive command, in response to the detected folding angles and the detected inclination, specifying a desired movement of the boom tip or an end hose attached thereto; and actuating, via drive assemblies, the boom segments in response to the drive command.

13. The method of claim 11, wherein the last segment forms a boom tip, wherein the inclination sensor is arranged at the boom tip.

14. The method of claim 11, wherein the inclination sensor is the only inclination sensor of the large manipulator.

* * * * *